United States Patent [19]

Elkins et al.

[11] 3,876,079

[45] Apr. 8, 1975

[54] MOUNTING RACK FOR RIFLES

[76] Inventors: Johnny C. Elkins, 1909½ Pulliam St.; Marvin C. Hanz, 2608 Parkview Dr., both of San Angelo, Tex. 76901

[22] Filed: Oct. 1, 1973

[21] Appl. No.: 401,983

Related U.S. Application Data

[63] Continuation-in-part of Ser. No. 256,509, May 24, 1972.

[52] U.S. Cl. ............... 211/64; 211/87; 224/42.45 R
[51] Int. Cl. ............... A47f 5/08; A47f 7/00
[58] Field of Search .......... 211/87, 64, 60 SK, 60 R, 211/86, 63, 103; 224/42.45 A, 42.45 R, 42.46 A, 42.46 R

[56] References Cited
UNITED STATES PATENTS

| | | | |
|---|---|---|---|
| 2,536,293 | 1/1951 | Koses | 211/87 X |
| 2,550,796 | 5/1951 | Francis | 211/87 X |
| 2,599,824 | 6/1952 | Griffin | 211/87 |
| 2,746,661 | 5/1956 | Kaplan | 224/42.45 A |
| 2,764,332 | 9/1956 | Lemley | 224/42.45 A |
| 3,007,582 | 11/1961 | Lindstrom | 211/87 |
| 3,294,247 | 12/1966 | Norrington | 211/64 |

*Primary Examiner*—Ramon S. Britts
*Attorney, Agent, or Firm*—Marcus L. Bates

[57] ABSTRACT

A mounting rack for rifles comprised of a pair of spaced support members which are secured to a vehicle window in laterally spaced relation. Each support member comprises co-acting slide members having rifle receiving cradle members depending therefrom, and diametrically opposed blade members which can be slidably received between the gasket and the window glass of the rear window of a vehicle.

The mounting rack can be rapidly installed within the vehicle and can be readily interchanged between vehicles of different sizes.

4 Claims, 11 Drawing Figures

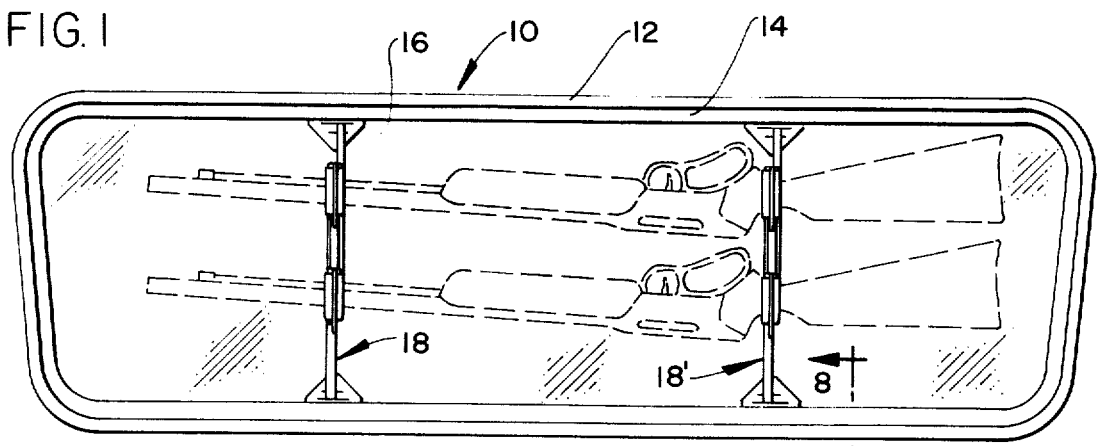
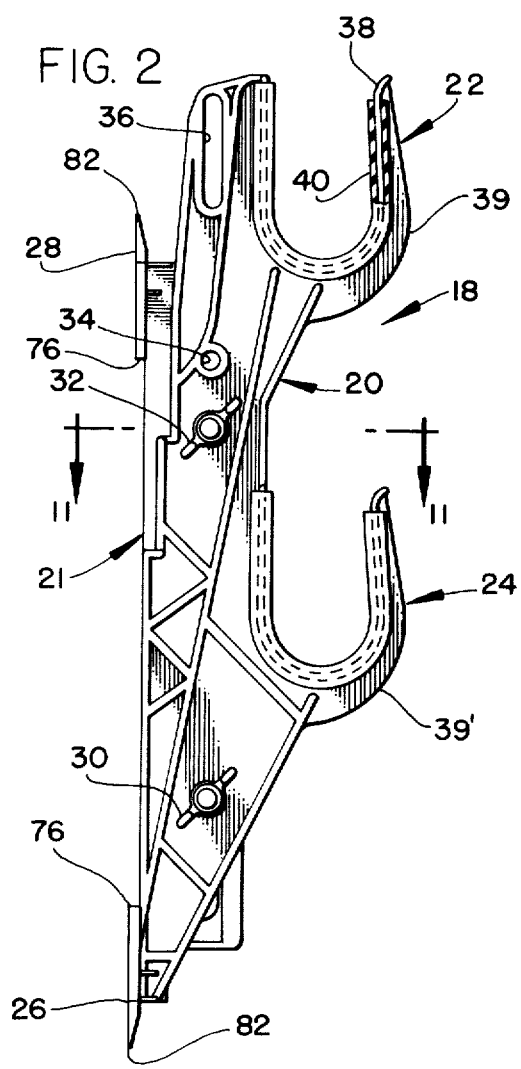
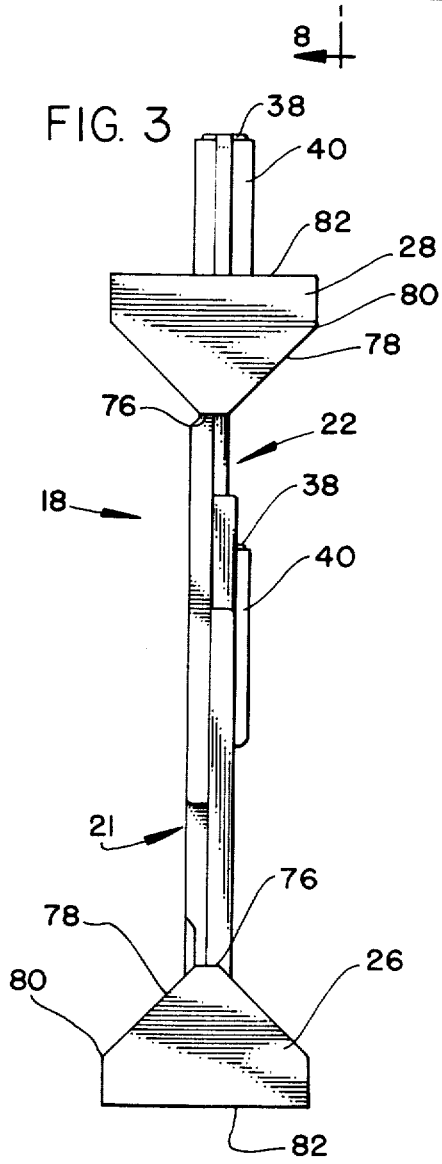

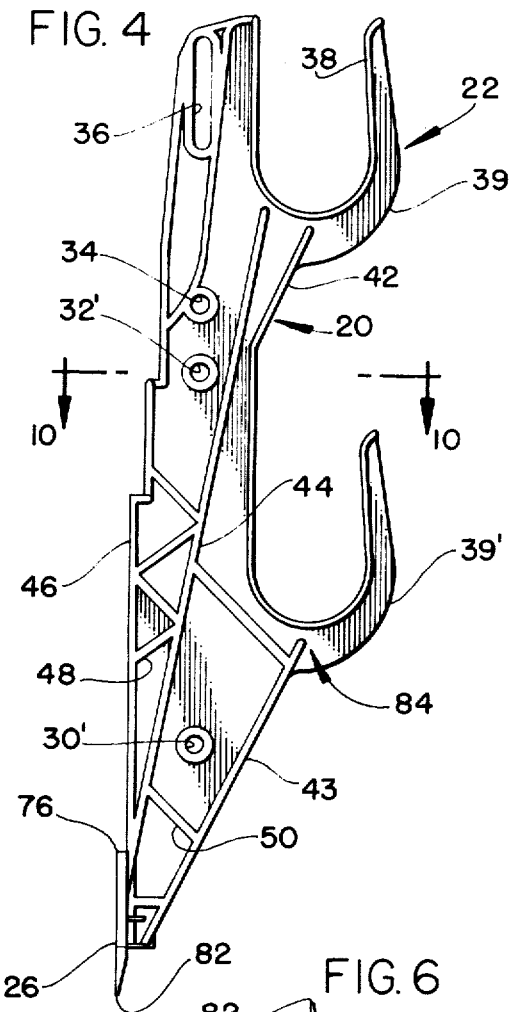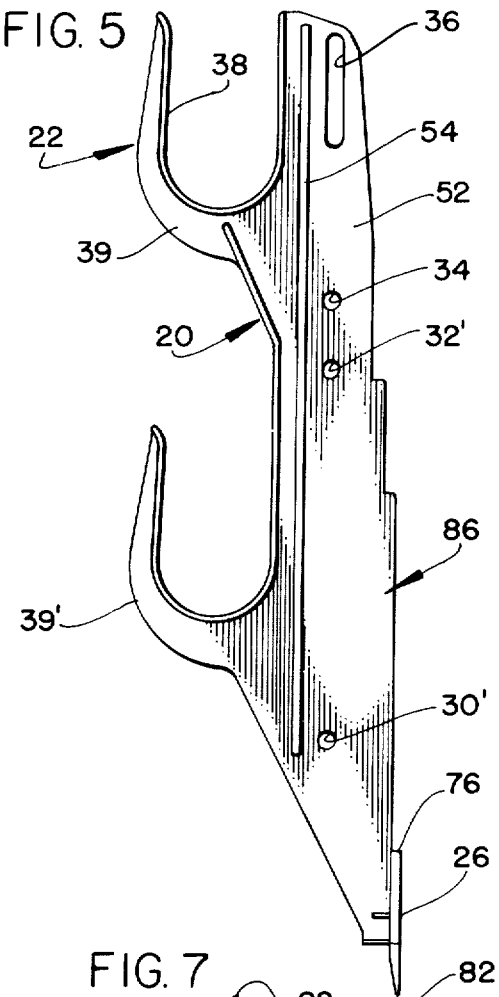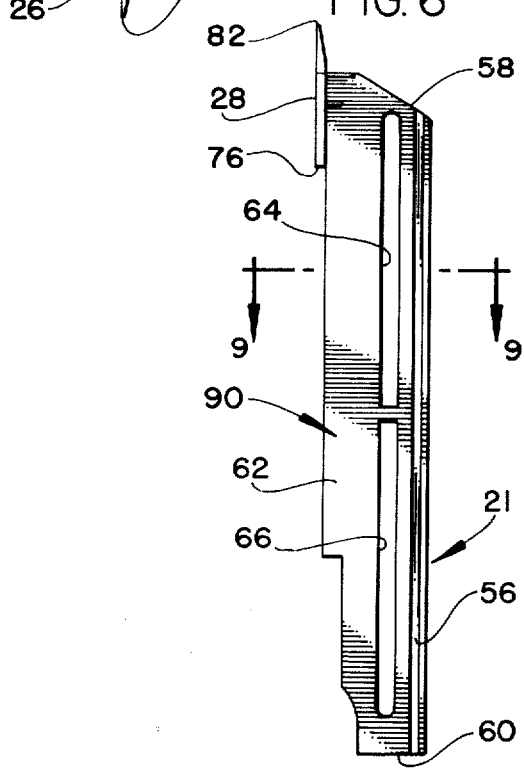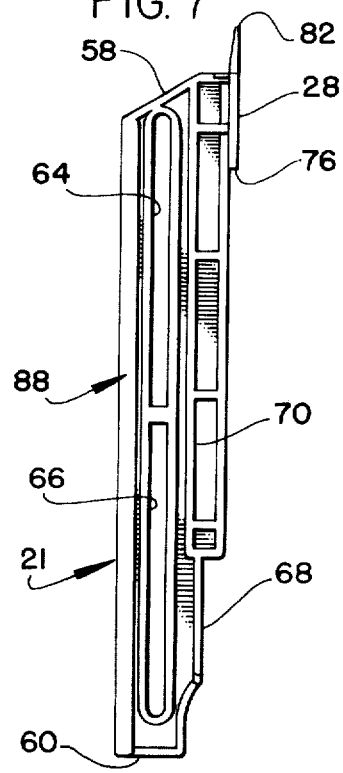

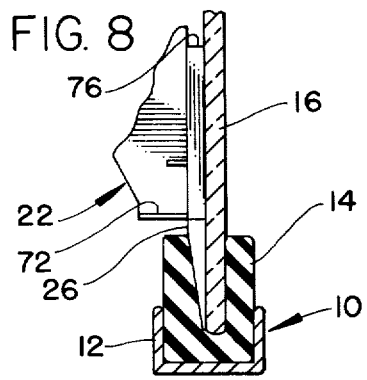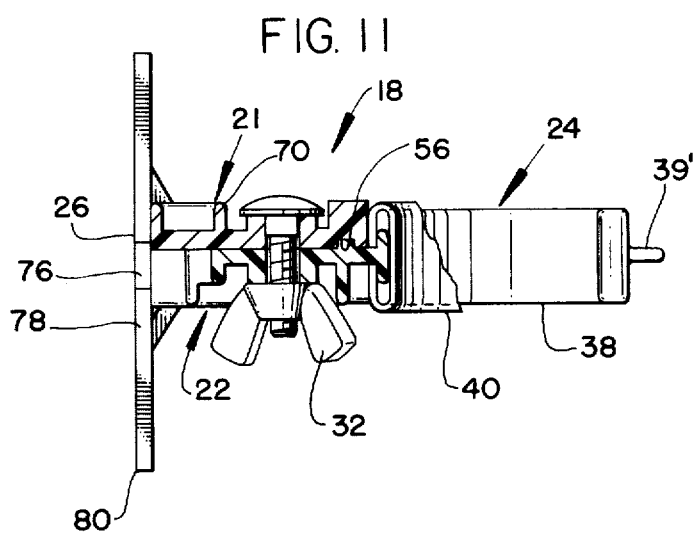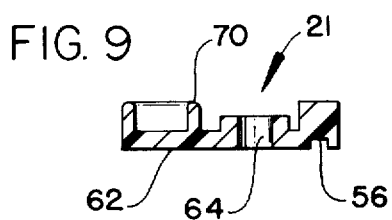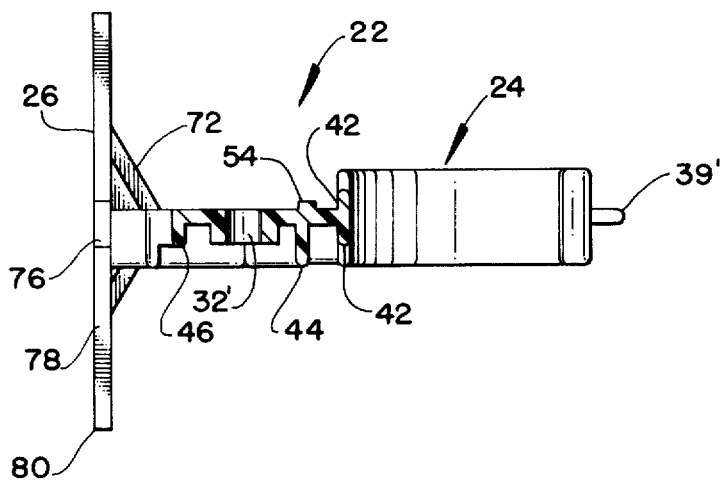

MOUNTING RACK FOR RIFLES

CROSS REFERENCE TO RELATED APPLICATIONS

The instant application is a Continuation-In-Part of parent application Ser. No. 256,509, filed May 24, 1972, entitled "Gun Rack."

BACKGROUND OF THE INVENTION

Vehicle window mounting racks for rifles and the like are known in the prior art and take on various different forms such as exemplified by the U.S. Pat. Nos. to Lindstrom 3,007,582; Norrington 3,294,247; Francis 2,550,796; Kaplin 2,746,661; and Koses 2,536,293.

As evidenced by these prior art examples, vehicle window racks for supporting objects therefrom are complex in design and potentially detrimental to the structure of the vehicle, especially where the window frame member must be jacked apart in order to provide anchoring means for the rack. Alternatively, structural members of the vehicle must be drilled and fitted with a fastener means which not only requires limited skilled use of hand or power tools, but also defaces the interior of the vehicle. Moreover, direct attachment of the rack to any structural component of the vehicle inherently transmits undesirable loads from the vehicle into the rack and consequently into a rifle cradled by the rack, thereby unduly jarring the rifle, and often, when traveling on rough roads, the rifle is dislodged from its cradle. Moreover, imparting heavy loads into the rifle could inadvertently cause the rifle to be discharged.

Accordingly, it is desirable to provide improvements in a mounting rack for rifles which can be readily and easily installed in spaced superimposed relationship upon a rear window of a vehicle without defacing the vehicle interior; which can be readily installed without the use of tools and the like; which is adjustable from one size window to another; and, which can be removed from the vehicle whenever it is desired to do so.

It is further desirable that such a mounting rack be situated in a manner whereby a minimum of vehicle loads are transported into the rifle cradled by the rack.

SUMMARY OF THE INVENTION

This invention specifically relates to a vehicle mounting rack for rifles comprised of laterally spaced support members secured in superimposed spaced relationship to a vehicle window. Each support member is comprised of first and second co-acting slide members movable relative to one another, with each member having diametrically opposed support blades which are inserted between the rubber gasket and the glass of a vehicle window assembly. Outwardly disposed from one support member is a cradle means for supporting a rifle therewithin.

Guide means formed on the co-acting slide members enable the blade members to be moved relative to one another in aligned relationship therewith. The blades are aligned in a common plane with the cradle means being normally opposed thereto so that a rifle placed within the cradle means is releasably held spaced from the window glass.

Accordingly, a primary object of the present invention is the provision of improvements in mounting racks for rifles which can be used in combination with a window assembly of a vehicle.

Another object of the invention is to provide a mounting rack for rifles which is readily adjustable so that it can be rapidly assembled and easily installed to structural components of various different sizes of vehicle window assemblies.

A further object of this invention is to disclose and provide a rifle supporting assembly which can be readily secured for support between a gasket and window glass of an automotive window assembly.

A still further object of this invention is to provide a molded plastic mounting rack for rifles which is secured in supporting relationship to the gasket of an automotive window assembly.

These and various other objects and advantages of the invention will become readily apparent to those skilled in the art upon reading the following detailed description and claims and by referring to the accompanying drawings.

The above objects are attained in accordance with the present invention by the provision of apparatus fabricated in a manner substantially as described in the above abstract and summary.

BRIEF DESCRIPTION OF THE DRAWINGS

FIG. 1 is an isolated elevational view of an automotive rear window assembly having a mounting rack for rifles made in accordance with the present invention operatively associated therewith;

FIG. 2 is an enlarged, part cross-sectional side view of one of the assembled spaced support members disclosed in FIG. 1;

FIG. 3 is a rear view of the assembled support member disclosed in FIG. 2;

FIG. 4 is a side view of part of the apparatus disclosed in FIG. 2;

FIG. 5 shows the opposed side of the slide member disclosed in FIG. 4;

FIG. 6 is a side view of one of the slide members disclosed in FIGS. 2 and 3;

FIG. 7 discloses the opposed side of the slide member disclosed in FIG. 6;

FIG. 8 is an enlarged, broken, part cross-sectional view taken along line 8—8 of FIG. 1 showing an important aspect of the present invention;

FIG. 9 is an enlarged, cross-sectional view taken along line 9—9 of FIG. 6;

FIG. 10 is an enlarged, part cross-sectional view taken along line 10—10 of FIG. 4; and, FIG. 11 is an enlarged, part cross-sectional view taken along line 11—11 of FIG. 2.

DETAILED DESCRIPTION OF THE INVENTION

FIG. 1 illustrates a rear window assembly 10 of a vehicle, such as a pickup truck, for example. The window includes the usual frame 12 provided with the usual gasket 14 which resiliently holds a window glass 16 therewithin in the usual manner.

A mounting rack for rifles comprised of a pair of support members 18, 18' is operatively connected to the rear window assembly.

As seen in FIG. 2, in conjunction with some of the remaining figures, each support member is comprised of a first slide member 20 slidably connected to a second slide member 21, with the first slide member having integrally connected thereto and outwardly depending therefrom upper and lower cradle means 22 and 24.

A lower blade member 26 is an integral part of the first slide members while an upper blade member 28 is an integral part of the second slide member. The blades of each support member are diametrically opposed to one another and movable towards and away from one another in accordance with the relative position of the first and second slide members. Friction locks 30, 32 increase the friction between the two slide members. Aperture 34 is provided for enabling the relative travel between the two slide members to be endowed with greater adjustability by placement of fastener 32 therewithin.

As seen in FIGS. 2 and 4, in conjunction with the remaining figures, an elongated slot 36 is aligned along a common line with apertures 34, 32' and 30'.

Reinforcement web 38 defines the interior surface of the cradle and reinforces the free end portion 39 thereof. The web provides an interiorly disposed flange about which there is received a split oval shaped resilient pad 40 so that a rifle placed therewithin cannot be scratched or marred. Additionally, the rifle often will be of a size which will compress the pad causing it to resiliently capture the rifle in biased relationship by the cradle means.

The before mentioned web 38 together with web reinforcements 42, 44, 46, 48, and 50 greatly rigifies the first slide member and provides a truss-like configuration which strengthens the entire structure. In particular, outer web member 42 commences near the web 38 in attached relationship to the vertical flange 39 of the upper cradle member, and extends in a downward direction where it ultimately forms the inside peripheral surface area of the lower cradle member. The innermost web member 46 extends in an upward direction from attachment to the lower blade and describes the rearward and upper outer peripheral surface of the slide member. The upper portion of web 46 joins web 38 and continues about the inside peripheral surface of the upper cradle member as web 38. Each of the webs 42 and 43 terminate as an integral portion of the vertical flanges 39 which form the cradle members. Diagonal web member 44 is spaced between the inner and outer web members and is connected thereto by the illustrated cross-bracings 48 and 50. The cross-bracings together with the elongated web members provide a monocoque-like structure which adequately bears transverse, tortional, and lateral loads which may be placed thereon by the weight of the rifle placed within the cradle.

FIG. 5 shows that the low friction face 52 of the first slide member is intersected by an outwardly extending vertical tongue member 54. The tongue member is more or less parallel to the glass contacting face 26 of the support blade. As best seen in FIG. 6, a groove 56 similarly extends more or less parallel to blade 28 of the second slide member. The groove is placed in indexed relationship with tongue 54, with the groove 56 being of a sufficient depth to receive the entire outwardly extending tongue 54 therein. The groove is open ended at each extremity of the slide member as illustrated by the numerals 58 and 60 so that tongue member 54 can slide in close tolerence relationship therewithin, with a marginal end portion thereof extending from either of the outwardly opening portions of the groove as may be required.

Face 62 of slide member 21 slidably engages face 52 of slide member 20 in low friction relationship therewith. Elongated slots 64 and 66 are indexed relative to tongue 54, groove 56 and apertures 30', 32', 34, and slot 36 so that as each slide member moves relative to the other, at least two of the apertures 30', 32', 34, or 36 are always in alignment with the elongated slots 64 and 66, thereby permitting the opposed blades 26, 28 to be adjusted to an infinite number of different spaced positions within the limits of the operation of the support member.

Rim web 68 defines the outer marginal edge portion of slide member 21 and is interconnected to a parallel spaced web 70 by the illustrated cross-web members. Slots 64 and 66 are defined by the illustrated webs which reinforce the second slide member 21 in a manner similar to the first slide member. As shown in FIG. 10, gusset 72 ties the support blade to a marginal portion of the web member.

Each of the blades terminate at 76 as an integral portion of the slide member. Sloped edge 78 of the blade is joined to vertical edge portion 80 with the blade terminating in a reduced edge portion at 82 to form a horizontal sharp leading edge portion. Hence, the blade is in the form of a rectangle having an edge portion 82 reduced in thickness for insertion between a window glass and gasket, and another portion 78 in the form of a truncated triangle, with the last portion being joined to the main body portion of the slide member as indicated by numeral 76.

Numerals 84 and 88 indicate the ribbed side of the respective slide members while numerals 86 and 90 indicate the smooth faced or low friction side of the slide members.

In operation, members 20 and 21 are placed with the smooth sides thereof abutting one another with the tongue engaging the groove. The members are slid apart an estimated amount which will enable the sharp ends of the opposed blades to be inserted under the window gasket. Fastener means 30, 32 are next placed through apertures 30', 32', 34 or the slot 36, as may be required for proper adjustment.

The blades are then moved toward one another body amount to enable the faces thereof to be placed in abutting relationship against the inside surface area of the rear window glass, whereupon the blades are then slid apart so that each blade is received between the glass and the gasket in the illustrated manner of FIGS. 1 and 8. The fastener means are then adjusted so that the faces of the slide members are brought together in high friction relationship. This simple expedient completes the installation of the spaced pair of support members, thereby enabling a rifle to be placed within the cradles in the illustrated manner of FIG. 1.

I claim:

1. In combination with a vehicle window gasket and glass assembly, a mounting rack for rifles comprising a pair of support members adapted to be secured solely to the gasket and glass in laterally spaced relationship to one another;

each support member comprising a first and second slide member; each slide member having means forming a slidable surface and a support blade thereon, said support blade having a marginal end portion inserted between the vehicle window gasket and glass assembly;

cradle means outwardly disposed from and attached to one said slide member for contributing to the support of a rifle;

each of said slide members being an elongated body arranged normally to said support blades, with each of said slide members having one of said blades attached thereto and forming one end portion thereof, one said blade and one said cradle means being an integral part of one said slide member, and means forming spaced ribs along at least one of said elongated bodies for reinforcing said slide member;

guide means formed on said first and second slide members so that one said slide member can be guidably moved in aligned relationship respective to the other of said slide members, said guide means on said first and second slide members includes a longitudinally extending tongue and groove with the groove being formed on one of said slide members and the tongue being formed on the remaining of said slide members, said tongue being slidably received within said groove with the slidable surface of one member slidably engaging the slidable surface of the remaining member;

each said support blade being arranged on each said slide member so that when one slide member is moved relative to the other, the support blades are moved towards and away from one another; said support blades being arranged in a common plane with said cradle means being normally disposed relative to the common plane; each said support blade having a marginal depending free end portion reduced in thickness and inserted between said glass and said gasket, said marginal depending free end portion of said blade extending free of the slide member;

and fastener means for increasing the friction of said slidable surfaces to effectively lock the slide members together;

so that a blade can be placed against a surface of the window glass, the blades inserted under the window gasket by sliding the first slide member relative to the second slide member, after which the slide members may be locked together by the ·fastener means to thereby support a gun placed in the cradles solely by the glass and gasket.

2. The apparatus of claim 1 wherein said fastener means includes spaced apertures placed in said first slide member, said second slide member being provided with spaced slots arranged to be placed in registry with said spaced apertures when said tongue is received within said groove, and a bolt means placed through the apertures and slots when the apertures are aligned with the slots.

3. The apparatus of claim 1 wherein
said support blade is in the form of a rectangle having an edge portion reduced in thickness for insertion between a window glass and gasket, and another portion in the form of a truncated triangle, with the last portion being joined to the main body portion of said slide member.

4. The combination of claim 1 wherein at least one of said support blades is in the form of a rectangle having a marginal depending edge portion reduced in thickness for insertion between the window glass and gasket, and another portion in the form of a truncated triangle, with the last portion being joined to the main body portion of said slide member.

5. The combination of claim 1 wherein said slidable surfaces on said slide members lie in a plane which is positioned normally to either of said blades, said tongue and groove of said guide means being formed parallel to said slide surface with said tongue of one slide member extending through the slide surface of the other slide member.

6. The combination of claim 5 wherein said ribs and said slide surface are formed on opposed sides of said slide member.

7. A mounting rack for rifles comprising a pair of support members for being removably affixed in supported relationship to the gasket and glass of a fixed rear window of a pick-up truck, with each support member being laterally spaced apart from one another so that they jointly can support a rifle;

each support member comprising a first and second coacting slide member; each slide member having means forming a slidable surface thereon; a support blade on each slide member, said blade having a marginal end portion which can be inserted between the vehicle window gasket and glass assembly so that spaced parts of the gasket together with a face of the glass contribute the entire support for the support members;

cradle means outwardly disposed from and attached to one said slide member for contributing to the support of a rifle;

each of said slide members being an elongated body arranged normally to said support blades, with each of said slide members having one of said blades attached thereto and forming one end portion thereof; one said blade and one said cradle means being an integral part of one said slide member, and means forming spaced ribs along at least one of said elongated bodies for reinforcing said slide member;

guide means forming on said first and second slide members so that one said slide member can be guidably moved in aligned relationship respective to the other of said slide members, said guide means on said first and second slide members includes a longitudinally extending tongue and groove with the groove being formed on one of said slide members and the tongue being formed on the remaining of said slide members, said tongue being slidably received within said groove with the slidable surface of one member slidably engaging the slidable surface of the remaining member;

said first and second slide members being arranged so that when one slide member is moved respective to the other, the opposed blades attached thereto are moved towards and away from one another, thereby changing the effective length of the support member; said blades of one support member being arranged in a common plane; said cradle means being normally disposed relative to the last said plane;

said support blade being in the form of an enlarged flat body having a free marginal end portion reduced in thickness for insertion between the window glass and gasket, and another portion being reduced in width and joined to the main body portion of said slide member;

means for increasing the friction of said slidable surfaces to effectively releasably lock the slide members of a support member together;

so that the face of the blades can be placed against the surface of the window glass, the blades inserted under the window gasket by sliding the first member relative to the second member, after which the members may be locked together by the fastener means to thereby support a gun placed in the cradles solely by the glass and gasket.

8. The apparatus of claim 7 wherein said means for increasing the friction of said slidable surfaces include spaced apertures placed in said first slide member, said second slide member being provided with spaced slots arranged to be placed in registry with said spaced apertures when said tongue is received within said groove, and a bolt means placed through the apertures and slots when the apertures are aligned with the slots, said bolt means being part of said fastener means.

9. The apparatus of claim 7 wherein said slidable surfaces on said slide members lie in a plane which is positioned normally to either of said blades, said tongue and groove of said guide means being formed parallel to said slide surface with said tongue of one slide member extending through the slide surface of the other slide member.

10. The apparatus of claim 9 wherein said ribs and said slide surface are formed on opposed sides of said slide member.

* * * * *